(12) United States Patent
Caveny et al.

(10) Patent No.: US 7,422,062 B2
(45) Date of Patent: Sep. 9, 2008

(54) METHODS OF TREATING SUBTERRANEAN FORMATIONS USING TREATMENT FLUIDS COMPRISING CHLORINATED CARBOHYDRATES

(75) Inventors: William J. Caveny, Rush Springs, OK (US); Rickey L. Morgan, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 90 days.

(21) Appl. No.: 11/291,718

(22) Filed: Dec. 1, 2005

(65) Prior Publication Data

US 2007/0125538 A1 Jun. 7, 2007

(51) Int. Cl.
*E21B 33/13* (2006.01)
(52) U.S. Cl. .................................. 166/294; 166/279
(58) Field of Classification Search ................ None
See application file for complete search history.

(56) References Cited

U.S. PATENT DOCUMENTS

| | | | |
|---|---|---|---|
| 3,615,223 A | 10/1971 | Burrqughs et al. | |
| 3,954,489 A | 5/1976 | Uchikawa et al. | |
| 4,095,987 A * | 6/1978 | Walker ...................... | 106/648 |
| 4,131,480 A | 12/1978 | McCurrich et al. | |
| 4,432,801 A | 2/1984 | Tegiacchi et al. | |
| 4,502,969 A * | 3/1985 | Shell .......................... | 507/211 |
| 5,220,960 A | 6/1993 | Totten et al. | |
| 5,264,470 A | 11/1993 | Eoff | |
| 5,281,270 A | 1/1994 | Totten et al. | |
| 5,447,197 A | 9/1995 | Rae et al. | |
| 5,547,506 A | 8/1996 | Rae et al. | |
| 5,728,209 A | 3/1998 | Bury et al. | |
| 6,173,778 B1 | 1/2001 | Rae et al. | |
| 6,227,294 B1 | 5/2001 | Chatterji et al. | |
| 6,461,658 B1 | 10/2002 | Merkel et al. | |
| 6,722,433 B2 | 4/2004 | Brothers et al. | |
| 6,797,050 B2 | 9/2004 | Hoffman et al. | |

(Continued)

FOREIGN PATENT DOCUMENTS

EP 0 582 367 A 2/1994

(Continued)

OTHER PUBLICATIONS

Material Safety Data Sheet for "Splenda® Brand Sucralose, Crystalline Solid Form," dated Jan. 7, 2003.

(Continued)

*Primary Examiner*—Zakiya W. Bates
*Assistant Examiner*—Angela M DiTrani
(74) *Attorney, Agent, or Firm*—Craig W. Roddy; Baker Botts, LLP.

(57) ABSTRACT

Subterranean treatment operations, and more particularly, methods of treating subterranean formations using treatment fluid compositions including chlorinated carbohydrates, are provided. An example of a method is a method of treating a subterranean formation, including: providing a treatment fluid including water, a hydraulic cement, and a chlorinated carbohydrate; placing the treatment fluid in a subterranean formation; and permitting the treatment fluid to treat the formation. An example of a method is a method that includes providing a cement composition that includes water, a hydraulic cement, and an additive that includes a chlorinated carbohydrate and a tartaric acid; placing the cement composition in a subterranean formation; and permitting the cement composition to set therein.

20 Claims, 1 Drawing Sheet

U.S. PATENT DOCUMENTS

| | | |
|---|---|---|
| 6,832,652 B1 | 12/2004 | Dillenbeck et al. |
| 7,067,000 B1 | 6/2006 | Szymanski et al. |
| 7,303,625 B2 | 12/2007 | Caveny et al. |
| 2001/0050031 A1 | 12/2001 | Bredt et al. |
| 2003/0091714 A1 | 5/2003 | Merkel et al. |
| 2003/0176293 A1 | 9/2003 | Schilling et al. |
| 2007/0125277 A1 | 6/2007 | Caveny et al. |
| 2007/0125278 A1 | 6/2007 | Caveny et al. |
| 2007/0125539 A1 | 6/2007 | Caveny et al. |
| 2007/0129260 A1 | 6/2007 | Caveny et al. |
| 2007/0129261 A1 | 6/2007 | Caveny et al. |

FOREIGN PATENT DOCUMENTS

| | | |
|---|---|---|
| WO | WO 2004/076376 A | 9/2004 |
| WO | WO 2005/036986 A | 4/2005 |

OTHER PUBLICATIONS

National Industry Chemicals Notification and Assessment Scheme (NICNAS) Full Public Report On Slenda/Sucralose dated Apr. 2003.
Caveny, William et al., "Treatment Fluids Comprising Chlorinated Carbohydrates" filed Dec. 1, 2005 as U.S. Appl. No. 11/291,743.
Caveny, William et al., "Additives Comprising Chlorinated Carbohydrates" filed Dec. 1, 2005 as U.S. Appl. No. 11/291,720.
Splenda® package, undated but admitted to be prior art.
Splenda® No Calorie Sweetner FAQ's, printed from http://www.splenda.com/print.jhtml?is=splenda/fags/nocalorie.inc on Mar. 22, 2006.
Caveny, William, J. et al. "Cement Compositions Comprising Maltodextrin" U.S. Appl. No. 11/379,482, filed Apr. 20, 2006.
Caveny, William, J. et al., "Methods of Cementing Subterranean Formations Using Cement Compositions Comprising Maltodextrin" U.S. Appl. No. 11/379,489, filed Apr. 20, 2006.
Caveny, William, J. et al., "Additives Comprising Maltodextrin" U.S. Appl. No. 11/379,490, filed Apr. 20, 2006.
Notice of Allowance for U.S. Appl. No. 11/291,743 dated Aug. 3, 2007.
Foreign Communication related to a Counterpart Application dated Apr. 10, 2007.
Office Action for U.S. Appl. No. 11/291,743 dated Dec. 27, 2006.
Office Action from U.S. Appl. No. 11/379,482, filed Apr. 11, 2008.
Foreign Search Report from a related application, dated Nov. 20, 2007.
Notice of Allowance from U.S. Appl. No. 11/291,743, dated Oct. 22, 2007.
Notice of Allowance from U.S. Appl. No. 11/291,743, dated Sep. 11, 2007.
Notice of Allowance from U.S. Appl .No. 11/379,489, dated Nov. 22, 2007.
Office Action from U.S. Appl. No. 11/379,489, dated May 24, 2007.
Office Action from U.S. Appl. No. 11/379,482, dated Dec. 27, 2006.
Office Action from U.S. Appl. No. 11/379,482, dated Jul. 03, 2007.
Office Action from U.S. Appl. No. 11/379,482, dated Nov. 05, 2007.
Notice of Allowance from U.S. Appl. No. 11/379,489, dated Mar. 04, 2008.

* cited by examiner

METHODS OF TREATING SUBTERRANEAN FORMATIONS USING TREATMENT FLUIDS COMPRISING CHLORINATED CARBOHYDRATES

CROSS-REFERENCE TO RELATED APPLICATIONS

This application is related to U.S. patent application Ser. No. 11/291,743, entitled "Treatment Fluids Comprising Chlorinated Carbohydrates," and U.S. patent application Ser. No. 11/291,720, entitled "Additives Comprising Chlorinated Carbohydrates," both filed on the same day herewith, the entirety of both of which is herein incorporated by reference.

BACKGROUND

The present invention relates to subterranean treatment operations, and more particularly, to methods of treating subterranean formations using treatment fluid compositions comprising chlorinated carbohydrates.

Hydraulic cement compositions commonly are utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of a pipe string disposed therein. The cement composition is permitted to set in the annular space, thereby forming therein an annular sheath of hardened substantially impermeable cement that substantially supports and positions the pipe string in the well bore and bonds the exterior surface of the pipe string to the walls of the well bore. Hydraulic cement compositions also are used in remedial cementing operations such as plugging highly permeable zones or fractures in well bores, plugging cracks and holes in pipe strings, and the like.

Set retarders commonly may be included in cement compositions, among other things, to delay the set time of the cement composition. Among other things, set retarders may delay the set time of a cement composition exposed to high subterranean temperatures, and thereby extend the time during which the cement composition may remain pumpable after the cement composition has been mixed. A variety of conventional set retarders have been developed and used successfully, including, inter alia, sugars, borates, phosphate compounds, and lignin-based compounds. However, the use of conventional set retarders may be problematic. For example, conventional set retarders undesirably may slow the development of a cement's compressive strength. Furthermore, conventional set retarders may be incompatible with certain cement additives, and conventional set retarders may not be suitable for use in environmentally sensitive applications.

SUMMARY

The present invention relates to subterranean treatment operations, and more particularly, to methods of treating subterranean formations using treatment fluid compositions comprising chlorinated carbohydrates.

An example of a method of the present invention is a method of treating a subterranean formation, comprising: providing a treatment fluid comprising water, a hydraulic cement, and a chlorinated carbohydrate; placing the treatment fluid in a subterranean formation; and permitting the treatment fluid to treat the formation.

An example of a method of the present invention is a method comprising providing a cement composition comprising water, a hydraulic cement, and an additive comprising a chlorinated carbohydrate and a tartaric acid; placing the cement composition in a subterranean formation; and permitting the cement composition to set therein.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

Figure 1:
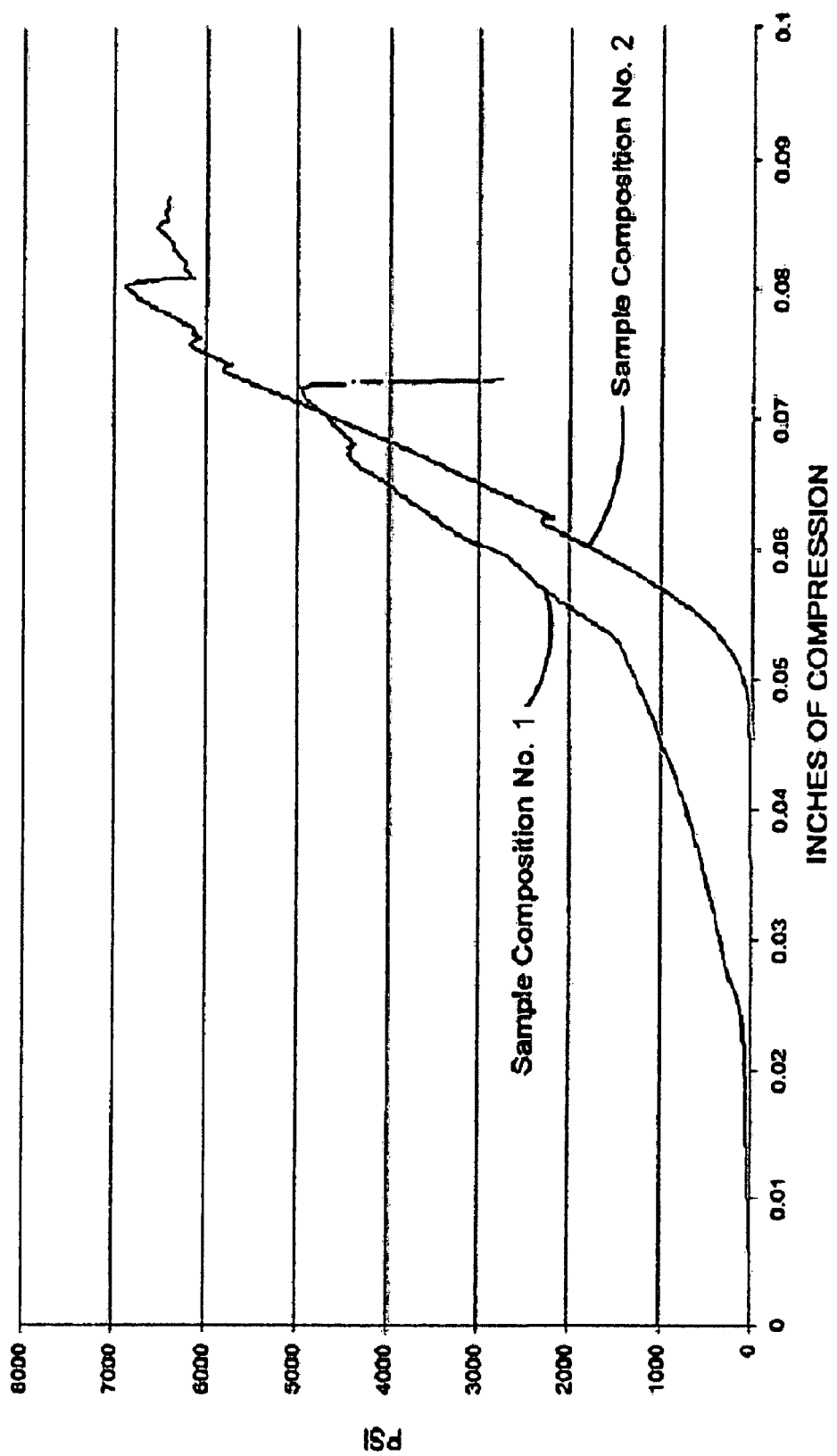
FIG. 1 illustrates the results of a crush test on sample compositions, including a cement composition of the present invention.

While the present invention is susceptible to various modifications and alternative forms, specific embodiments thereof have been shown in the drawing and are herein described. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention relates to subterranean treatment operations, and more particularly, to methods of treating subterranean formations using treatment fluid compositions comprising chlorinated carbohydrates. While the compositions and methods of the present invention are useful in a variety of applications, they may be particularly useful for subterranean well completion and remedial operations, such as primary cementing of casings and liners in well bores, including those in production wells, which include multi-lateral subterranean wells. They also may be useful for surface cementing operations, including construction cementing operations.

The treatment fluid compositions of the present invention generally comprise a cement, water, and a chlorinated carbohydrate. Among other things, the presence of a chlorinated carbohydrate in the treatment fluid compositions of the present invention desirably may retard the setting time of the treatment fluid compositions, without delaying compressive strength development. The chlorinated carbohydrate, inter alia, desirably may retard the setting time of the treatment fluid compositions of the present invention while accelerating early compressive strength development. In certain embodiments, the treatment fluid compositions of the present invention comprising a chlorinated carbohydrate ultimately may develop compressive strength that exceeds the compressive strength that the treatment fluid compositions of the present invention ultimately would develop without the presence of the chlorinated carbohydrate. Certain embodiments of the treatment fluid compositions of the present invention may have environmental benefits, particularly when used in regions of the world that may have comparatively strict environmental regulations.

Cements suitable for use in subterranean applications are suitable for use in the present invention. Furthermore, cements suitable for use in surface applications (e.g., construction cements) may be suitable for use in the present invention. In certain embodiments, the treatment fluid compositions of the present invention comprise a hydraulic cement. A variety of hydraulic cements are suitable for use, such as those comprising one or more of calcium, aluminum, silicon, oxygen, and sulfur, which set and harden by reaction with water. Such hydraulic cements include, but are not limited to, Portland cements, pozzolanic cements, gypsum cements, high alumina content cements, silica cements, high alkalinity cements, slag cements, shale cements, and mixtures thereof. In certain embodiments, a hydraulic cement may be used that comprises a mixture of Portland cement and slag. In certain embodiments, a hydraulic cement may be used that comprises slag activated with a suitable alkali activator (e.g., soda ash and/or caustic). In certain embodiments, the hydraulic cement comprises a vitrified shale. An example of a suitable vitrified shale is commercially available under the trade name "PRESSURE-SEAL® FINE LCM" vitrified shale from TXI Energy Services, Inc., Houston, Tex. In certain embodiments, the hydraulic cement comprises an API cement, such as API Classes A, B, C, G, H, or J Portland cements, or equivalents thereof. The above-mentioned API cements are defined and described in API Specification for Materials and Testing for Well Cements, API Specification 10A, 22nd Edition, dated Jan. 1, 1995.

The water utilized in the treatment fluid compositions of the present invention may be fresh water, saltwater (e.g., water containing one or more salts dissolved therein), brine (e.g., saturated saltwater), or seawater. Generally, the water may be from any source provided that it does not contain an excess of compounds that adversely affect the treatment fluid compositions. The water may be present in an amount sufficient to form a pumpable slurry. Generally, the water is present in the treatment fluid compositions of the present invention in an amount in the range of from about 15% to about 200% by weight of cement ("bwoc") therein. In certain embodiments, the water may be present in the treatment fluid compositions of the present invention in an amount in the range of from about 25% to about 60% bwoc therein.

A variety of chlorinated carbohydrates may be used in the treatment fluid compositions of the present invention. As referred to herein, the term "chlorinated carbohydrate" will be understood to include any carbohydrate that comprises one or more chlorine atoms. The term specifically includes, inter alia, sucralose and derivatives thereof, as well as 4-chloro-4-deoxygalactose (sometimes referred to as "4-CG") and 1,6-dichloro-1,6-dideoxyfructose (sometimes referred to as "1,6-DCF"). As referred to herein, the term "derivative" will be understood to include any compound that is made from one of the listed compounds (e.g., made from sucralose), for example, by replacing one atom in the listed compound with another atom or group of atoms. As referred to herein, the term "sucralose" will be understood to include a chlorinated carbohydrate having the chemical name 1,6-dichloro-1,6-dideoxy-β-D-fructofuranosyl-4-chloro-4-deoxy-α-D-galactopyranoside that has been assigned CAS Number 56-038-13-2. Sucralose often may be referred to (in technical literature, material safety data sheets, marketing materials, and the like) by a number of synonyms, including, for example and without limitation: "1,6-dichloro-1,6-dideoxy-β-D-fructofuranosyl-4-chloro-4-deoxy-α-D-galactose"; "trichlorogalactosucrose"; "TGS"; "4,1',6'-trichlorogalactosucrose"; and "SPLENDA". The intent of the present invention is to encompass all of these synonyms within the term "sucralose." Accordingly, in certain embodiments of the present invention, the chlorinated carbohydrates may comprise sucralose. A suitable source of sucralose is commercially available under the trade name "SPLENDA." In certain other embodiments of the present invention, the chlorinated carbohydrates may comprise one or more of 4-chloro-4-deoxygalactose, 1,6-dichloro-1,6-dideoxyfructose, and derivatives thereof. One of ordinary skill in the art, with the benefit of this disclosure, will be able to identify other chlorinated carbohydrates that may be suitable for a particular application.

Generally, the chlorinated carbohydrates should be present in the treatment fluid compositions of the present invention in an amount sufficient to retard the setting of the treatment fluid compositions of the present invention for a desired time. The amount of chlorinated carbohydrates that may be included may depend on a number of factors, including, but not limited to, the bottom hole circulating temperature of the well into which the treatment fluid is to be placed, the particular formulation of the chosen chlorinated carbohydrates, and the like. In some embodiments, the quantity of the chlorinated carbohydrates to be included in the treatment fluid composition may be determined prior to preparation of the treatment fluid composition. For example, the quantity of the chlorinated carbohydrates to be included in the treatment fluid composition may be determined by performing thickening time tests of the type described in API Specification 10A, Twenty-Third Edition, April, 2002. More particularly, in certain embodiments, the chlorinated carbohydrates may be present in the treatment fluid compositions of the present invention in an amount in the range of from about 0.01% to about 5% bwoc. In some embodiments, the chlorinated carbohydrates may be present in the treatment fluid compositions of the present invention in an amount in the range of from about 0.1% to about 1% bwoc.

Optionally, the treatment fluid compositions of the present invention may comprise a dispersant. When present, the dispersant, among other things, may control the rheology of the treatment fluid composition and stabilize the treatment fluid composition over a broad density range. A variety of dispersants known to those skilled in the art may be used in accordance with the present invention. An example of a suitable dispersant is a water-soluble polymer prepared by the caustic-catalyzed condensation of formaldehyde with acetone wherein the polymer contains sodium sulfate groups, which dispersant is commercially available under the trade designation "CFR-3™" dispersant from Halliburton Energy Services, Inc., Duncan, Okla. Another suitable dispersant is commercially available under the trade designation "CFR-2™" dispersant, also from Halliburton Energy Services, Inc., of Duncan, Okla. Where used, the dispersant may be present in the treatment fluid compositions of the present invention in an amount in the range of from about 0.1% to about 2.0% bwoc. In some embodiments, the dispersant may be present in the treatment fluid compositions of the present invention in an amount in the range of from about 0.1% to about 1.0% bwoc.

Optionally, the treatment fluid compositions of the present invention may comprise a hydratable polymer. When present in the treatment fluid compositions of the present invention, the hydratable polymer may increase the viscosity of the treatment fluid compositions of the present invention, among other things. Various hydratable polymers can be utilized in the treatment fluid compositions of the present invention including, but not limited to, carboxymethylcellulose, hydroxyethylcellulose, carboxymethylhydroxyethylcellulose, vinyl sulfonated polymers, and hydratable graft polymers. An example of a suitable hydratable polymer is a cellulose derivative commercially available from Dow Chemical Co., under the trade name "CARBOTRON 20." Where used, the hydratable polymer may be present in the treatment fluid compositions of the present invention in an amount sufficient to contribute a desired degree of viscosity to the treatment fluid compositions of the present invention. In some embodiments, the hydratable polymer may be present in the treatment fluid compositions of the present invention in an amount in the range of from about 0.01% to about 5.0% bwoc. In some embodiments, the hydratable polymer may be present in the treatment fluid compositions of the present invention in an amount in the range of from about 0.1% to about 2.0% bwoc.

The additives of the present invention generally comprise a chlorinated carbohydrate. In certain embodiments of the present invention, a chlorinated carbohydrate may be combined with a tartaric acid to form another additive of the present invention. In certain embodiments of the present invention, the additives of the present invention that comprise a chlorinated carbohydrate and a tartaric acid may comprise about 60% to about 90% chlorinated carbohydrate by weight, and about 10% to about 40% tartaric acid by weight. In certain embodiments of the present invention, the additives of the present invention that comprise a chlorinated carbohydrate and a tartaric acid may comprise about 70% to about 80% chlorinated carbohydrate by weight, and about 20% to about 30% tartaric acid by weight. In certain embodiments of the present invention the additives of the present invention that comprise a chlorinated carbohydrate and a tartaric acid may comprise tartaric acid in an amount in the range of from about 10% to about 70% by weight of the chlorinated carbohydrate. In certain embodiments of the present invention the additives of the present invention that comprise a chlorinated carbohydrate and a tartaric acid may comprise tartaric acid in an amount in the range of from about 25% to about 45% by weight of the chlorinated carbohydrate.

The additives of the present invention comprising chlorinated carbohydrates may retard the setting of the treatment fluid compositions of the present invention at a variety of temperatures, including temperatures of up to about 200° F. in certain embodiments, temperatures of up to about 250° F. in certain embodiments, and temperatures greater than about 250° F. in certain embodiments.

The treatment fluid compositions of the present invention comprising chlorinated carbohydrates may be suitable for use at a variety of temperatures. Certain embodiments of the treatment fluid compositions of the present invention are suitable for use at temperatures of up to about 200° F. Certain embodiments of the treatment fluid compositions of the present invention are suitable for use at temperatures of up to about 250° F. Certain embodiments of the treatment fluid compositions of the present invention may be suitable for use at temperatures greater than about 250° F. In some embodiments, additives may be included in the treatment fluid compositions of the present invention to facilitate use at elevated temperatures.

As will be recognized by those skilled in the art, the treatment fluid compositions of this invention also may include additional suitable additives, including, among other things, accelerants, defoamers, silica, microspheres, viscosifiers, fibers, weighting materials, salts, vitrified shale, calcium hydroxide, fly ash, fluid loss control additives, set retarders and the like. Any suitable additive may be incorporated within the treatment fluid compositions of the present invention. An example of a suitable silica is a fine silica flour that is commercially available from Halliburton Energy Services, Inc., of Duncan, Okla., under the trade name "SSA-1™" fine silica flour. An example of a suitable fluid loss control additive is commercially available from Halliburton Energy Services, Inc., of Duncan, Okla., under the trade name "FWCA" additive. An example of a suitable high-temperature viscosifier is commercially available from Halliburton Energy Services, Inc., of Duncan, Okla., under the trade name "SUSPEND HT" anti-settling additive. Examples of suitable set retarders include various organic acids including, but not limited to, tartaric acid, citric acid, gluconic acid, oleic acid, phosphoric acid, and uric acid. An example of a suitable tartaric acid is commercially available from Halliburton Energy Services, Inc., of Duncan, Okla., under the trade name "HR®-25" retarder. One of ordinary skill in the art, with the benefit of this disclosure, will be able to recognize where a particular additive is suitable for a particular application.

To facilitate a better understanding of the present invention, the following illustrative examples of some of the preferred embodiments are given. In no way should such examples be read to limit, or define, the entire scope of the invention.

EXAMPLE 1

Sample treatment fluid compositions were prepared as follows. A cementitious material (Texas Lehigh Class H) and chlorinated carbohydrate were dry blended by adding dry materials in a one-liter glass jar and shaking vigorously. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974. The sample composition also was tested using an ultrasonic cement analyzer to determine its strength at a desired temperature and pressure.

Sample Composition No. 1 comprised Texas Lehigh Class H cement and 39.4% water bwoc, with no chlorinated carbohydrate.

Sample Composition No. 2, a treatment fluid composition of the present invention, comprised Texas Lehigh Class H cement, 0.25% sucralose bwoc and 39.4% water bwoc.

Sample Composition No. 3 comprised Texas Lehigh Class H cement and 39.4% water bwoc, with no chlorinated carbohydrate.

Sample Composition No. 4, a treatment fluid composition of the present invention, comprised Texas Lehigh Class H cement, 0.1% sucralose bwoc and 39.4% water bwoc.

The results of the testing are set forth in Tables 1 and 2 below, and in FIG. 1.

TABLE 1

| Sample Composition | Water (% bwoc) | Sucralose (% bwoc) | Test Temp. (° F.) | Pump Time (hr:min) |
| --- | --- | --- | --- | --- |
| No. 1 | 39.4 | None | 206 | 0:48 |
| No. 2 | 39.4 | 0.25 | 206 | 10:43 |
| No. 3 | 39.4 | None | 140 | 1:34 |
| No. 4 | 39.4 | 0.1 | 140 | 4:50 |

TABLE 2

| Sample Composition | Water (% bwoc) | Sucralose (% bwoc) | Test Temp. (° F.) | 500 Psi Time (hr:min) | 24 Hr. Strength (psi) | 48 Hr. Strength (psi) | 48 Hr. Crush Strength (psi) |
|---|---|---|---|---|---|---|---|
| No. 1 | 39.4 | None | 206-250 | 2:40 | 2,620 | 2,800 | 4,960 |
| No. 2 | 39.4 | 0.25 | 206-250 | 3:58 | 4,060 | 4,720 | 6,860 |
| No. 3 | 39.4 | None | 140-156 | 3:23 | 2,569 | 3,300 | 4,860 |
| No. 4 | 39.4 | 0.1 | 140-156 | 14:03 | 1,951 | 3,100 | 5,000 |

In Table 2 above, the caption "500 Psi Time" refers to the time required for the sample composition to develop 500 psi compressive strength. The captions "24 Hr. Strength (psi)" and "48 Hr. Strength (psi)" refer to the strength (measured in psi) that the sample composition had attained by 24 hours, and 48 hours, respectively, after the onset of testing. The caption "48 Hr. Crush Strength (psi)" refers to the strength (measured in psi) required to crush the sample composition at a time 48 hours after the onset of testing.

Example 1 illustrates, inter alia, that the treatment fluid compositions of the present invention comprising chlorinated carbohydrates are suitable for use in subterranean and surface cementing operations.

EXAMPLE 2

Sample treatment fluid compositions were prepared as follows. A cementitious material (Texas Lehigh Class H) and chlorinated carbohydrate were dry blended by adding dry materials in a one-liter glass jar and shaking vigorously. In some sample treatment fluid compositions, as indicated below, one or more of the following additives were also dry blended with the sample treatment fluid compositions: B-8 (octaborate), SSA-1™ fine silica flour, FWCA additive, and SUSPEND HT anti-settling additive. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 5, a treatment fluid composition of the present invention, comprised Texas Lehigh Class H cement, 2% sucralose bwoc, 35% SSA-1™ fine silica flour bwoc, 0.1% FWCA additive bwoc, 0.2% SUSPEND HT anti-settling additive bwoc, and 48.55% water bwoc.

Sample Composition No. 6, a treatment fluid composition of the present invention, comprised Texas Lehigh Class H cement, 1.5% sucralose bwoc, 35% SSA-1™ fine silica flour bwoc, 0.1% FWCA additive bwoc, 0.2% SUSPEND HT anti-settling additive bwoc, and 48.55% water bwoc.

Sample Composition No. 7, a treatment fluid composition of the present invention, comprised Texas Lehigh Class H cement, 1% sucralose bwoc, 35% SSA-1™ fine silica flour bwoc, 0.1% FWCA additive bwoc, 0.2% SUSPEND HT anti-settling additive bwoc, and 48.55% water bwoc.

Sample Composition No. 8, a treatment fluid composition of the present invention, comprised Texas Lehigh Class H cement, 0.5% sucralose bwoc, 35% SSA-1™ fine silica flour bwoc, and 48.55% water bwoc.

Sample Composition No. 9, a treatment fluid composition of the present invention, comprised Texas Lehigh Class H cement, 1% sucralose bwoc, 35% SSA-1™ fine silica flour bwoc, 0.05% FWCA additive bwoc, and 48.55% water bwoc.

Sample Composition No. 10, a treatment fluid composition of the present invention, comprised Texas Lehigh Class H cement, 1.5% sucralose bwoc, 35% SSA-1™ fine silica flour bwoc, 0.05% FWCA additive bwoc, and 48.55% water bwoc.

Sample Composition No. 11, a treatment fluid composition of the present invention, comprised Texas Lehigh Class H cement, 0.75% sucralose bwoc, 35% SSA-1™ fine silica flour bwoc, 0.05% FWCA additive bwoc, and 48.55% water bwoc.

Sample Composition No. 12, a treatment fluid composition of the present invention, comprised Texas Lehigh Class H cement, 0.5% sucralose bwoc, 0.5% B-8 bwoc, 35% SSA-1™ fine silica flour bwoc, 0.05% FWCA additive bwoc, 0.2% SUSPEND HT anti-settling additive bwoc, and 48.55% water bwoc.

Sample Composition No. 13, a treatment fluid composition of the present invention, comprised Texas Lehigh Class H cement, 0.5% sucralose bwoc, 1% B-8 bwoc, 35% SSA-1™ fine silica flour bwoc, 0.2% SUSPEND HT anti-settling additive bwoc, and 48.55% water bwoc.

The results of the testing are set forth in Table 3 below.

TABLE 3

| Sample Composition | Water (% bwoc) | Sucralose (% bwoc) | B-8 (% bwoc) | SSA-1 ™ (% bwoc) | FWCA (% bwoc) | SUSPEND HT (% bwoc) | Test Temp. (° F.) | Pump Time (hr:min) |
|---|---|---|---|---|---|---|---|---|
| No. 5 | 48.55 | 2 | 0 | 35 | 0.1 | 0.2 | 395 | 1:15 |
| No. 6 | 48.55 | 1.5 | 0 | 35 | 0.1 | 0.2 | 350 | 1:21 |
| No. 7 | 48.55 | 1 | 0 | 35 | 0.1 | 0.2 | 300 | 1:33 |
| No. 8 | 48.55 | 0.5 | 0 | 35 | 0 | 0 | 250 | 0:55 |
| No. 9 | 48.55 | 1.0 | 0 | 35 | 0.05 | 0 | 250 | 0:56 |
| No. 10 | 48.55 | 1.5 | 0 | 35 | 0.05 | 0 | 250 | 0:36 |
| No. 11 | 48.55 | 0.75 | 0 | 35 | 0.05 | 0 | 250 | 0:52 |
| No. 12 | 48.55 | 0.5 | 0.5 | 35 | 0.05 | 0.2 | 350 | 1:18 |
| No. 13 | 48.55 | 0.5 | 1.0 | 35 | 0 | 0.2 | 300 | 1:28 |

Sample Composition No. 7 also was tested using an ultrasonic cement analyzer to determine its strength at a desired temperature and pressure, the results of which are shown in Table 4 below.

TABLE 4

| Sample Composition | Water (% bwoc) | Sucralose (% bwoc) | Test Temp. (° F.) | 500 Psi Time (hr:min) | 24 Hr. Strength (psi) | 48 Hr. Strength (psi) |
|---|---|---|---|---|---|---|
| No. 7 | 48.55 | 1 | 300 | 12:31 | 3,369 | 3,540 |

Example 2 illustrates, inter alia, that the treatment fluid compositions of the present invention comprising chlorinated carbohydrates are suitable for use in subterranean and surface cementing operations.

EXAMPLE 3

Sample treatment fluid compositions were prepared as follows. A cementitious material (Texas Lehigh Class H), a chlorinated carbohydrate, and B-8 (octaborate) were dry blended by adding dry materials in a one-liter glass jar and shaking vigorously. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 14 comprised Texas Lehigh Class H cement, 0.1% B-8 bwoc, and 39.4% water bwoc.

Sample Composition No. 15 comprised Texas Lehigh Class H cement, 0.2% B-8 bwoc, and 39.4% water bwoc.

Sample Composition No. 16 comprised Texas Lehigh Class H cement, 0.3% B-8 bwoc, and 39.4% water bwoc.

Sample Composition No. 17, a treatment fluid composition of the present invention, comprised Texas Lehigh Class H cement, 0.05% sucralose bwoc, 0.1% B-8 bwoc, and 39.4% water bwoc.

Sample Composition No. 18, a treatment fluid composition of the present invention, comprised Texas Lehigh Class H cement, 0.1% sucralose bwoc, 0.1% B-8 bwoc, and 39.4% water bwoc.

The results of the testing are set forth in Table 4 below.

TABLE 5

| Sample Composition | Water (% bwoc) | Sucralose (% bwoc) | B-8 (% bwoc) | Test Temp. (° F.) | Pump Time (hr:min) |
|---|---|---|---|---|---|
| No. 14 | 39.4 | 0 | 0.1 | 190 | 2:26 |
| No. 15 | 39.4 | 0 | 0.2 | 190 | 3:45 |
| No. 16 | 39.4 | 0 | 0.3 | 190 | 5:00+ |
| No. 17 | 39.4 | 0.05 | 0.1 | 190 | 6:00 |
| No. 18 | 39.4 | 0.1 | 0.1 | 190 | 4:50+ |

The pump times for Sample Compositions Nos. 16 and 18 were determined to exceed 5 hours and 4 hours 50 minutes, respectively, but the precise pump times were not determined.

Example 3 illustrates, inter alia, that the treatment fluid compositions of the present invention comprising chlorinated carbohydrates are suitable for use in subterranean and surface cementing operations.

EXAMPLE 4

Sample compositions were prepared as follows. A cementitious material (Texas Lehigh Class H) and chlorinated carbohydrate were dry blended by adding dry materials in a one-liter glass jar and shaking vigorously. In some sample compositions, as indicated below, one or more of the following additives were also dry blended with the sample compositions: B-8 (octaborate), HR®-25 retarder, SSA-1™ fine silica flour, FWCA additive, and SUSPEND HT anti-settling additive. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 19 comprised Texas Lehigh Class H cement, 1% B-8 bwoc, 35% SSA-1™ fine silica flour bwoc, and 48.55% water bwoc.

Sample Composition No. 20 comprised Texas Lehigh Class H cement, 0.25% B-8 bwoc, and 39.4% water bwoc.

Sample Composition No. 21, a treatment fluid composition of the present invention, comprised Texas Lehigh Class H cement, 1% sucralose bwoc, 0.25% HR®-25 retarder bwoc, 35% SSA-1™ fine silica flour bwoc, 0.1% FWCA additive bwoc, 0.2% SUSPEND HT anti-settling additive bwoc, and 48.42% water bwoc.

Sample Composition No. 22 comprised Texas Lehigh Class H cement, 0.25% HR®-25 retarder bwoc, 35% SSA-1™ fine silica flour bwoc, 0.1% FWCA additive bwoc, 0.2% SUSPEND HT anti-settling additive bwoc, and 48.42% water bwoc.

The results of the testing are set forth in Table 6 below.

TABLE 6

| Sample Composition | Water (% bwoc) | Sucralose (% bwoc) | B-8 or HR®-25 (% bwoc) | SSA-1™ (% bwoc) | FWCA (% bwoc) | SUSPEND HT (% bwoc) | Test Temp. (° F.) | Pump Time (hr:min) |
|---|---|---|---|---|---|---|---|---|
| No. 19 | 48.55 | 0 | 1% B-8 | 35 | 0 | 0 | 300 | 0:53 |
| No. 20 | 39.4 | 0 | 0.25% B-8 | 0 | 0 | 0 | 206 | 2:02 |

TABLE 6-continued

| Sample Composition | Water (% bwoc) | Sucralose (% bwoc) | B-8 or HR®-25 (% bwoc) | SSA-1™ (% bwoc) | FWCA (% bwoc) | SUSPEND HT (% bwoc) | Test Temp. (° F.) | Pump Time (hr:min) |
|---|---|---|---|---|---|---|---|---|
| No. 21 | 48.42 | 1 | 0.25% HR®-25 | 35 | 0.1 | 0.2 | 300 | 4:40 |
| No. 22 | 48.42 | 0 | 0.25% HR®-25 | 35 | 0.1 | 0.2 | 250 | 2:51 |

Sample Composition Nos. 21 and 22 also were tested using an ultrasonic cement analyzer to determine their strength at a desired temperature and pressure, the results of which are shown in Table 7 below.

TABLE 7

| Sample Composition | Water (% bwoc) | Sucralose (% bwoc) | Test Temp. (° F.) | 500 Psi Time (hr:min) | 24 Hr. Strength (psi) | 48 Hr. Strength (psi) |
|---|---|---|---|---|---|---|
| No. 21 | 48.42 | 1 | 300 | 7:34 | 5,544 | 5,800 (at 46 Hr.) |
| No. 22 | 48.42 | 0 | 300 | 6:24 | 4,397 | 4,479 |

Example 4 illustrates, inter alia, that the treatment fluid compositions of the present invention comprising chlorinated carbohydrates are suitable for use in subterranean and surface cementing operations.

EXAMPLE 5

Sample compositions were prepared as follows. A cementitious material (Texas Lehigh Class H) and an additive of the present invention comprising sucralose and HR®-25 retarder were dry blended by adding dry materials in a one-liter glass jar and shaking vigorously. The additive of the present invention comprising sucralose and HR®-25 retarder comprised a blend of 1 part HR®-25 retarder and 4 parts sucralose. In some sample compositions one or more of the following additives were also dry blended with the sample compositions: SSA-1™ fine silica flour, FWCA additive, and SUSPEND HT anti-settling additive. Next, a slurry was formed by adding an amount of water in a one-liter Waring blender, and then adding the dry-blended materials while the blender operated at about 2,500 rpm. Once all dry-blended materials had been added, the mixture in the blender was sheared at about 13,000 rpm for 35 seconds. Next, tests were run to determine the pump time of the sample composition at high temperature and high pressure according to API RP 10B, "Recommended Practices for Testing Oil-Well Cements and Cement Additives," dated 1974.

Sample Composition No. 23, a treatment fluid composition of the present invention, comprised Texas Lehigh Class H cement, 1% additive of the present invention comprising sucralose and HR®-25 retarder, 35% SSA-1™ fine silica flour bwoc, 0.05% FWCA additive bwoc, and 48.5% water bwoc.

Sample Composition No. 24, a treatment fluid composition of the present invention, comprised Texas Lehigh Class H cement, 1.25% additive of the present invention comprising sucralose and HR®-25 retarder, 35% SSA-1™ fine silica flour bwoc, 0.1% FWCA additive bwoc, 0.2% SUSPEND HT anti-settling additive bwoc, and 48.42% water bwoc.

Sample Composition No. 25, a treatment fluid composition of the present invention, comprised Texas Lehigh Class H cement, 2% additive of the present invention comprising sucralose and HR®-25 retarder, 35% SSA-1™ fine silica flour bwoc, 0.15% FWCA additive bwoc, 0.3% SUSPEND HT anti-settling additive bwoc, and 48.4% water bwoc.

Sample Composition No. 26, a treatment fluid composition of the present invention, comprised Texas Lehigh Class H cement, 3% additive of the present invention comprising sucralose and HR®-25 retarder, 35% SSA-1™ fine silica flour bwoc, 0.1% FWCA additive bwoc, 0.25% SUSPEND HT anti-settling additive bwoc, and 48.44% water bwoc.

The results of the testing are set forth in Table 8 below.

TABLE 8

| Sample Composition | Water (% bwoc) | Additive Comprising Sucralose and HR®-25 (% bwoc) | SSA-1™ (% bwoc) | FWCA (% bwoc) | SUSPEND HT (% bwoc) | Test Temp. (° F.) | Pump Time (hr:min) |
|---|---|---|---|---|---|---|---|
| No. 23 | 48.5 | 1 | 35 | 0.05 | 0 | 250 | 3:24 |
| No. 24 | 48.42 | 1.25 | 35 | 0.1 | 0.2 | 300 | not determined |
| No. 25 | 48.4 | 2 | 35 | 0.15 | 0.3 | 400 | 2:18 |
| No. 26 | 48.44 | 3 | 35 | 0.1 | 0.25 | 400 | 3:00 |

Example 5 illustrates, inter alia, that the treatment fluid compositions of the present invention comprising the additives of the present invention are suitable for use in subterranean and surface cementing operations.

Therefore, the present invention is well-adapted to attain the ends and advantages mentioned as well as those which are inherent therein. While numerous changes may be made by those skilled in the art, such changes are encompassed within the spirit of this invention as defined by the appended claims.

The terms in the claims have their plain, ordinary meaning unless otherwise explicitly and clearly defined by the patentee.

What is claimed is:

1. A method of treating a subterranean formation, comprising:
   providing a treatment fluid comprising water, a hydraulic cement, and a chlorinated carbohydrate;
   placing the treatment fluid in a subterranean formation; and
   permitting the treatment fluid to treat the formation.

2. The method of claim 1 wherein the treatment fluid is a cement composition.

3. The method of claim 1 wherein the chlorinated carbohydrate comprises sucralose or a derivative thereof.

4. The method of claim 1 wherein the chlorinated carbohydrate comprises 4-chloro-4-deoxygalactose or a derivative thereof.

5. The method of claim 1 wherein the chlorinated carbohydrate comprises 1,6-dichloro-1,6-dideoxyfructose or a derivative thereof.

6. The method of claim 1 wherein the chlorinated carbohydrate is present in the treatment fluid in an amount in the range of from about 0.01% to about 5% by weight of the hydraulic cement.

7. The method of claim 1 wherein the hydraulic cement comprises at least one cement selected from the group consisting of: a Portland cement; a pozzolanic cement; a gypsum cement; a high alumina content cement; a silica cement; a high alkalinity cement; a slag cement; vitrified shale; and any combination thereof.

8. The method of claim 1 further comprising permitting the chlorinated carbohydrate to retard the setting of the treatment fluid.

9. The method of claim 8 wherein placing the treatment fluid in a subterranean formation comprises placing the treatment fluid in a region of a subterranean formation having a temperature of up to about 200° F.

10. The method of claim 8 wherein placing the treatment fluid in a subterranean formation comprises placing the treatment fluid in a region of a subterranean formation having a temperature of up to about 250° F.

11. The method of claim 8 wherein placing the treatment fluid in a subterranean formation comprises placing the treatment fluid in a region of a subterranean formation having a temperature greater than about 250° F.

12. The method of claim 1 wherein the treatment fluid further comprises a tartaric acid.

13. The method of claim 12 wherein the treatment fluid further comprises a tartaric acid present in an amount in the range of from about 10% to about 70% by weight of the chlorinated carbohydrate.

14. The method of claim 1 wherein the treatment fluid is a cement composition and wherein permitting the treatment fluid to treat the formation comprises permitting the cement composition to set in the formation to form a cement sheath.

15. A method, comprising:
   providing a cement composition comprising water, a hydraulic cement, and an additive comprising a chlorinated carbohydrate and a tartaric acid;
   placing the cement composition in a subterranean formation; and permitting the cement composition to set therein.

16. The method of claim 15 wherein the chlorinated carbohydrate comprises sucralose or a derivative thereof.

17. The method of claim 15 wherein the chlorinated carbohydrate comprises 4-chloro-4-deoxygalactose or a derivative thereof.

18. The method of claim 15 wherein the chlorinated carbohydrate comprises 1,6-dichloro-1,6-dideoxyfructose or a derivative thereof.

19. The method of claim 15 wherein the chlorinated carbohydrate is present in the additive in an amount in the range of from about 60% to about 90% by weight of the additive.

20. The method of claim 15 wherein the chlorinated carbohydrate is present in the cement composition in an amount in the range of from about 0.01% to about 5% by weight of the hydraulic cement.

* * * * *